US008855183B2

(12) United States Patent
Dua et al.

(10) Patent No.: US 8,855,183 B2
(45) Date of Patent: Oct. 7, 2014

(54) ADAPTIVE COVARIANCE MATRIX CONDITIONING FOR A LINEAR EQUALIZER WITH RECEIVE DIVERSITY

(75) Inventors: Aditya Dua, San Diego, CA (US); Lei Xiao, San Diego, CA (US); Je Woo Kim, San Diego, CA (US); Feng Lu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 393 days.

(21) Appl. No.: 13/211,128

(22) Filed: Aug. 16, 2011

(65) Prior Publication Data

US 2012/0140808 A1 Jun. 7, 2012

Related U.S. Application Data

(60) Provisional application No. 61/418,474, filed on Dec. 1, 2010.

(51) Int. Cl.
*H03H 7/30* (2006.01)
*H04L 25/03* (2006.01)
*H04B 7/08* (2006.01)
*H04L 25/02* (2006.01)

(52) U.S. Cl.
CPC ........ *H04B 7/0885* (2013.01); *H04L 25/03292* (2013.01); *H04B 7/0854* (2013.01); *H04L 2025/03426* (2013.01); *H04L 25/0242* (2013.01); *H04L 25/0204* (2013.01)
USPC ............................ 375/229; 375/230; 375/232

(58) Field of Classification Search
USPC ................................ 375/229–236
See application file for complete search history.

(56) References Cited

U.S. PATENT DOCUMENTS

2006/0268962 A1* 11/2006 Cairns et al. ................... 375/148
2007/0004357 A1* 1/2007 Ojo et al. .................. 455/226.2
2007/0110200 A1* 5/2007 Mergen et al. ................ 375/350
2009/0180455 A1 7/2009 Ranganathan et al.

FOREIGN PATENT DOCUMENTS

WO WO9842089 A2 9/1998
WO WO2010072893 A1 7/2010

OTHER PUBLICATIONS

Partial International Search Report—PCT/US2011/048101, ISA/EPO—Oct. 12, 2011.
International Search Report and Written Opinion—PCT/US2011/048101—ISA/EPO—Nov. 28, 2011.

* cited by examiner

*Primary Examiner* — Sam K Ahn
*Assistant Examiner* — Janice Tieu
(74) *Attorney, Agent, or Firm* — Seyfarth Shaw LLP

(57) ABSTRACT

A method of wireless communication with improved performance employs an equalizer receiver with multiple receive antennas. Equalizer taps for linear filters of the equalizer receiver are generated by determining a conditioned covariance matrix of a first data path and a second data path based on a first gain ($g_0$) of this first data path and a second gain ($g_1$) of the second data path. The equalizer taps of the first data path and the second data path are determined based on the conditioned covariance matrix. The first data path and the second data path are then equalized using the equalizer taps. An equalized signal is generated by combining the equalized first data path with the equalized second data path.

20 Claims, 6 Drawing Sheets

ADAPTIVE COVARIANCE MATRIX CONDITIONING FOR A LINEAR EQUALIZER WITH RECEIVE DIVERSITY

CROSS-REFERENCE TO RELATED APPLICATION

This application claims the benefit of U.S. Provisional Patent Application No. 61/418,474, entitled "ADAPTIVE COVARIANCE MATRIX CONDITIONING FOR A LINEAR EQUALIZER WITH RECEIVE DIVERSITY" filed on Dec. 1, 2010, the disclosure of which is expressly incorporated herein by reference in its entirety.

TECHNICAL FIELD

This application generally relates to wireless communication systems, and more particularly to employing equalizer receivers in multiple receive antenna paths in a wireless communication system.

BACKGROUND

Wireless communication networks are widely deployed to provide various communication services such as voice, video, packet data, messaging, broadcast, and the like. These wireless networks may be multiple-access networks capable of supporting multiple-users by sharing available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Aspects of the present disclosure provide a method of wireless communication with improved performance. An equalizer receiver is employed with multiple receive antennas. The equalizer architecture includes a linear filter for each of the multiple receivers. An improved method for determining equalizer taps for the linear filters is provided according to an aspect of the disclosure. The method includes determining a conditioned covariance matrix of a first data path and a second data path based on a first gain ($g_0$) of this first data path and a second gain ($g_1$) of the second data path. The equalizer taps of the first data path and the second data path are determined based on the conditioned covariance matrix. The first data path and the second data path are then equalized using the equalizer taps. An equalized signal is generated by combining the equalized first data path with the equalized second data path.

According to one aspect, an initial covariance matrix of the first data path and the second data path is determined. The conditioned covariance matrix is then determined by adding a conditioning parameter ($\lambda$) to a first diagonal of the initial covariance matrix and adding the conditioning parameter ($\lambda$) times a relative gain factor to a second diagonal of the initial covariance matrix. The first diagonal corresponds to a data path having a lesser gain and the second diagonal corresponds to a data path having greater gain. The relative gain factor may be determined by determining the first gain factor ($g_0$) of the first data path, determining the second gain factor ($g_1$) of the second data path, and squaring a ratio of the first gain factor and the second gain factor. According to one aspect of the disclosure, the ratio may be determined by dividing the greater of the first gain factor ($g_0$) and the second gain factor ($g_1$) by the lesser of the first gain factor ($g_1$) and the second gain factor ($g_1$).

According to another aspect of the disclosure, an apparatus for wireless communication includes at least one processor and a memory coupled to the processor(s). The processor(s) is/are configured to determine a conditioned covariance matrix of a first data path and a second data path based on a first gain ($g_0$) of the first data path and a second gain ($g_1$) of the second data path and to determine equalizer taps of the first data path and the second data path based on the conditioned covariance matrix. The processor(s) is/are further configured to equalize the first data path and the second data path with the equalizer taps and to generate an equalized signal by combining the equalized first data path with the equalized second data path.

According to another aspect of the disclosure, a computer program product for wireless communications in a wireless network includes a computer-readable medium with non-transitory program code recorded thereon. The program code includes program code to determine a conditioned covariance matrix of a first data path and a second data path based on a first gain ($g_0$) of the first data path and a second gain ($g_1$) of the second data path. The program code also includes program code to determine equalizer taps of the first data path and the second data path based on the conditioned covariance matrix. The program code further includes program code to equalize the first data path and the second data path with the equalizer taps and program code to generate an equalized signal by combining the equalized first data path with the equalized second data path.

According to another aspect of the disclosure, an apparatus for wireless communication includes means for determining a conditioned covariance matrix of a first data path and a second data path based on a first gain ($g_0$) of the first data path and a second gain ($g_1$) of the second data path. The apparatus also includes means for determining equalizer taps of the first data path and the second data path based on the conditioned covariance matrix. The apparatus further includes means for equalizing the first data path and the second data path with equalizer taps of the first data path and the second data path. The apparatus also includes means for generating an equalized signal by combining the equalized first data path with the equalized second data path.

This has outlined, rather broadly, the features and technical advantages of the present disclosure in order that the detailed description that follows may be better understood. Additional features and advantages of the disclosure are described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it should be apparent to those skilled in the art that these concepts may be practiced without these specific details. In some instances, well-known structures and components are shown in block diagram form in order to avoid obscuring such concepts.

The techniques described herein may be used for various wireless communication networks such as HSDPA, CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
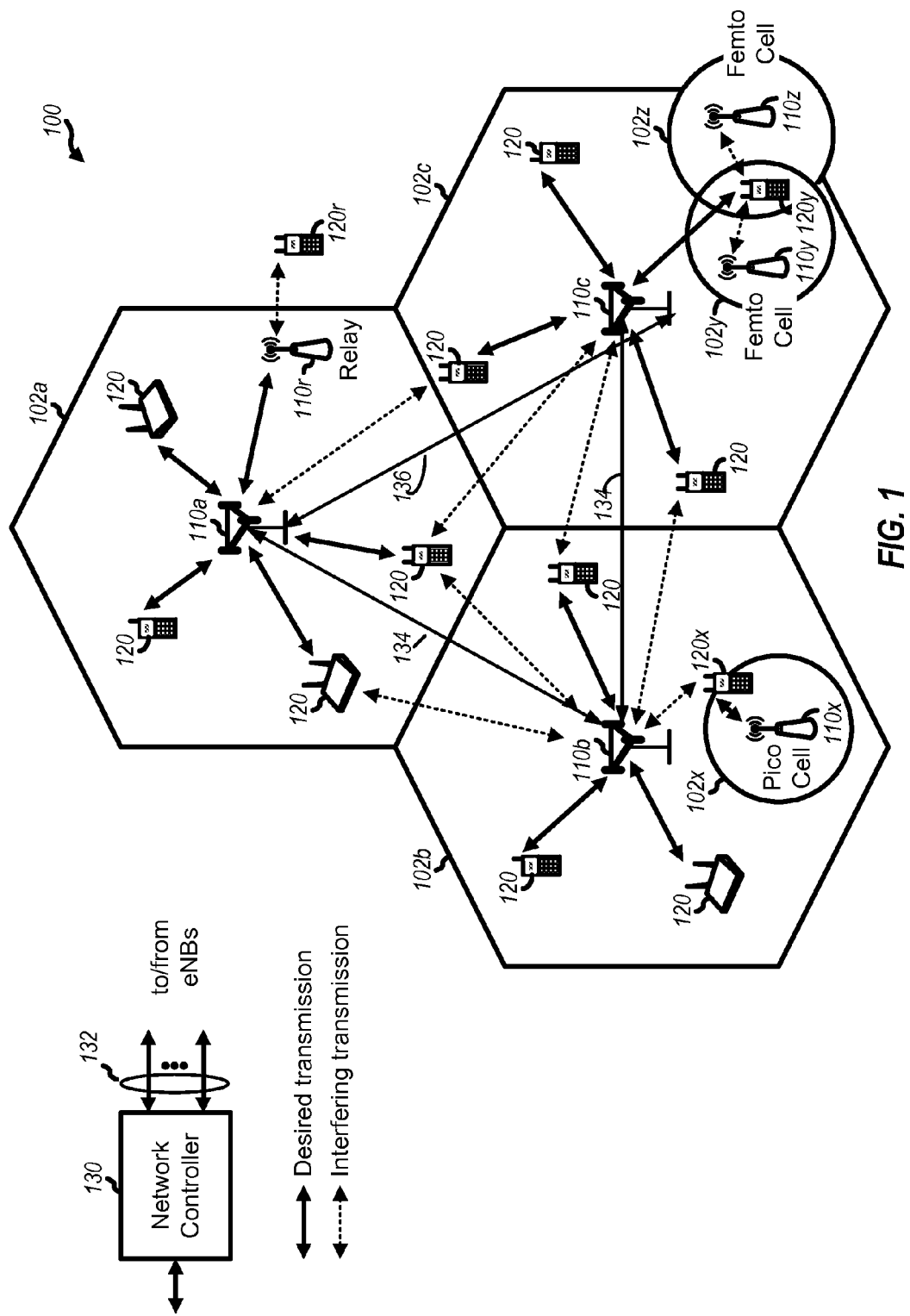
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110*a*, 110*b* and 110*c* are macro eNBs for the macro cells 102*a*, 102*b* and 102*c*, respectively. The eNB 110*x* is a pico eNB for a pico cell 102*x*. And, the eNBs 110*y* and 110*z* are femto eNBs for the femto cells 102*y* and 102*z*, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, tablet or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
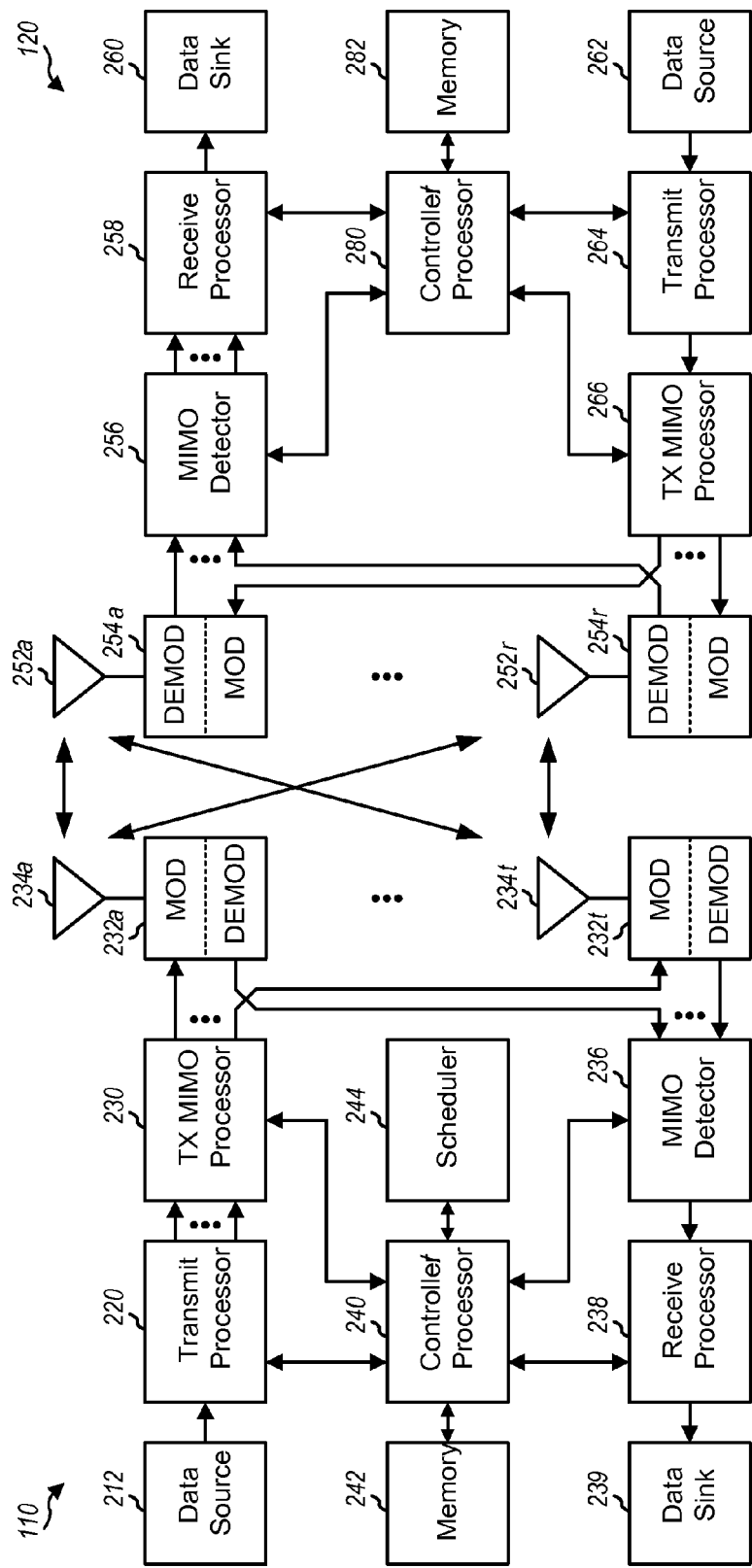
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data from a data source 262 and control information from the controller/processor 280. The processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the base station 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in FIG. 4, and/or other processes for the techniques described herein. The memories 242 and 282 may store data and program codes for the base station 110 and the UE 120, respectively. A scheduler 244 may schedule UEs for data transmission on the downlink and/or uplink.

In one configuration, the UE 120 configured for wireless communication includes means for determining an adaptively conditioned covariance matrix, means for determining equalizer taps, means for equalizing the first data path and the second data path with the equalizer taps; and means for generating an equalized signal by combining the equalized first data path with the equalized second data path. In one aspect, the aforementioned means may be the receive processor 258 configured to perform the recited functions. In another aspect, the aforementioned means may be any module or any apparatus configured to perform the functions recited by the aforementioned means.

The performance of a UE can be improved significantly on the downlink, for example, by employing an equalizer receiver to combat the frequency selective behavior of the wideband wireless channel. The performance of an equalizer receiver can be improved even further by employing multiple receive antennas at the UE to exploit spatial diversity.

Figure 3:
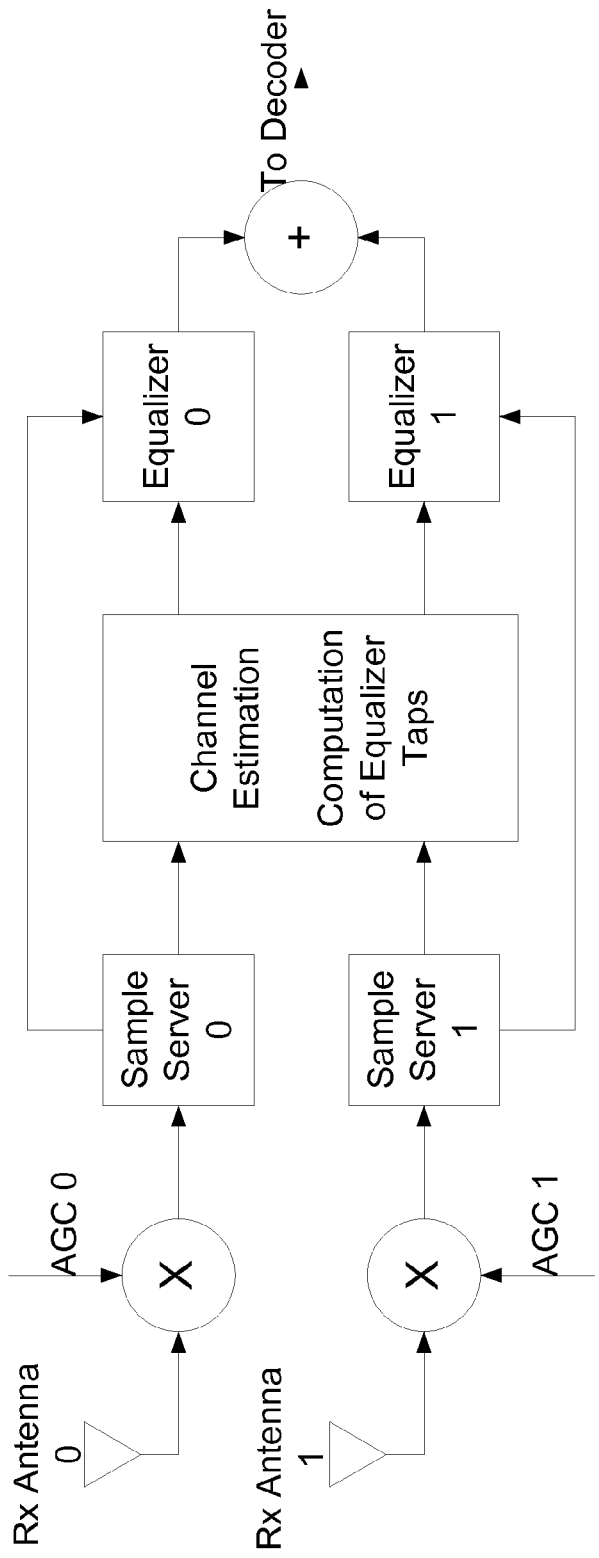
FIG. 3 is a high level block diagram of a conventional equalizer data path with receive diversity.

FIG. 3 is a high level block diagram of a conventional equalizer data path with receive diversity. The equalizer architecture has two linear filters (one for each receive chain). The coefficients for the two linear filters are computed based on a criterion of minimizing mean squared error between a transmitted chip level signal and a received chip level signal. Computation of the equalizer taps involves the inversion of the received signal covariance matrix. In order to make the inversion robust, the covariance matrix is conditioned by augmenting its diagonal with a non-zero term. The conditioning operation improves robustness of the covariance matrix but can degrade equalizer performance in situations where the two receive antennas experience a significant power differential (e.g. due to a deep channel fade on one of the receive antennas), for example.

Aspects of the present disclosure include a system and method for improved conditioning of the covariance matrix. According to an illustrative embodiment, the covariance matrix is adaptively conditioned over time to account explicitly for the differences in received powers at the two receive antennas. This can significantly improve UE performance in operating conditions where the received powers at two receive antennas are imbalanced due to deep channel fades (e.g., downlink throughput improves by ~12% in the standard power amplifier PA3 (Pedestrian A 3 kmph channel profile, as defined in the 3GPP Specification) channel profile at 20 dB geometry), for example. The disclosed method may be implemented with low computational complexity to provide significant performance benefits.

Details of the currently used equalizer architecture are described for better understanding of the improvements and augmentations provided by the present disclosure. In the equalizer architecture, linear minimum mean squared error (LMMSE) chip level equalizer taps with two receive antennas are jointly computed. The computations involve the following notation:

x(n): Chips sequence transmitted by the eNodeB (base station)
$h_i(k)$: $k^{th}$ tap of wireless channel from the transmit antenna at the eNodeB to the $i^{th}$ receive antenna
$y_i(n)$: Chips sequence received at the $i^{th}$ receive antenna, i $\in \{0, 1\}$
$w_j(n)$: Additive thermal noise at the $i^{th}$ receive antenna
$c_i(j)$: $j^{th}$ tap of the equalizer used to process the signal received at the $i^{th}$ receive antenna
K: Number of taps (per antenna) in the wireless channel (delay spread)
J: Number of taps (per antenna) in the equalizer used at the UE Further, the notation $\vec{f}$ denotes the vector f. The notation $(.)^*$ denotes the complex conjugate of a quantity. The notation $(.)^H$ denotes the Hermitian (conjugate transpose) of a matrix.

With the above notation, the chip level received signal at the $i^{th}$ receive antenna can be written as $$y_i(n) = \sum_{k=0}^{K-1} h_i(k)x(n-k) + w_i(n)$$

The estimate of the $p^{th}$ transmitted chip at the output of the equalizer is given by:

$$\hat{x}(p) = \sum_{j=0}^{J-1} c_0(j)y_0(p+j) + \sum_{j=0}^{J-1} c_1(j)y_1(p+j)$$

The LMMSE equalizer taps are computed such that the following mean-squared error objective function is reduced or minimized:

$$E[|x(p)-\hat{x}(p)|^2]$$

Using well known analysis techniques, the LMMSE equalizer taps can be computed as $$\vec{c}_{MMSE} = \begin{bmatrix} \vec{c}_0 \\ \vec{c}_1 \end{bmatrix} = \underbrace{\begin{bmatrix} R_{00} & R_{01}^H \\ R_{01} & R_{11} \end{bmatrix}}_{R}^{-1} \underbrace{\begin{bmatrix} \vec{h}_0^* \\ \vec{h}_1^* \end{bmatrix}}_{h}$$

or in shorthand, $\vec{c}_{MMSE} = R^{-1}\vec{h}$. Here $R_{00}$ is the J×J auto-covariance matrix for the primary receive antenna, $R_{11}$ is the J×J auto-covariance matrix for the secondary receive antenna, and $R_{01}$ is the J×J cross-covariance matrix between the primary and secondary receive antennas. Specifically, $$R_{00}(i,j)=E[y^*_0(i)y_0(j)], R_{11}(i,j)=E[y^*_1(i)y_1(j)],$$
$$R_{01}(i,j)=E[y^*_0(i)y_1(i)]$$

The covariance matrix R is not guaranteed to be invertible. Sometimes, even if the covariance matrix R is invertible, numerical instability may arise (in finite precision implementation, for example) if the covariance matrix R has eigenvalues close to 0. This could degrade equalizer performance. One technique for making the matrix inversion operation more robust involves conditioning the covariance matrix by augmenting the diagonal of the covariance matrix with non-zero terms. In particular, the LMMSE equalizer taps with covariance conditioning are computed as:

$$\vec{c}_{MMSE-Cond} = (R+\lambda I)^{-1}\vec{h}$$

where I denotes the 2J×2J identity matrix and $\lambda > 0$ is a design parameter. The equalizer taps in the equation above are the solution to a regularized minimum mean squared error problem with the modified objective function:

$$E[|x(p)-\hat{x}(p)|^2+\lambda||\vec{c}||^2],$$

where $\hat{x}(p)$ depends on $\vec{c}$. Adding λ to the diagonal of matrix R has the impact of adding a strictly positive term λ to the eigen-values of R, thereby improving the stability properties of the matrix inverse. There are no precise rules for selecting the value of the design parameter λ.

Wireless signals received over the air at a UE are sampled, digitized, and stored in finite precision in a buffer (sample server) for further processing. To account for the fluctuations in received signal level (due to wireless channel fading, etc.), the digitized samples are processed with an AGC (automatic gain control) circuit before being written to the sample server. The AGC circuit ensures roughly constant output signal power for a wide range of input signal powers. The AGC is designed to increase or maximize the SQNR (signal to quantization noise ratio) for the samples stored in the sample server.

Because the wireless signals received at two receive antennas undergo independent fluctuations in amplitude/power, they have independent, dedicated AGC circuits. The AGC circuits effectively introduce a gain on each of the signal data paths. The use of independent dedicated AGC circuits ensures that the SQNR on each receive chain is substantially maximized. However, because each receive chain has its own AGC, the two data paths can potentially experience different gains. For example, if one of the receive chains is undergoing a deep channel fade, it will see a much larger gain than the other receive chain.

The LMMSE architecture with covariance matrix conditioning as described above is derived under an implicit assumption that both receive chains see identical gains on their respective data paths. The independent AGC gains, while beneficial from an SQNR perspective, can degrade the performance of the LMMSE equalizer because the underlying assumption of equal gains is violated. This degradation is most noticeable in situations where the instantaneous AGC gains on the two receive chains are vastly different, for example when one of the receive antennas is experiencing a deep channel fade.

Aspects of the present disclosure include a system and method for improved conditioning of the covariance matrix which accounts for and accommodates independent AGC gains. In a first embodiment, instead of computing the linear MMSE equalizer taps as described above, the equalizer taps according to the present disclosure are computed as:

$$\vec{c}_{MMSE\text{-}AdaptCond} = (R+\Lambda)^{-1}\vec{h}$$

where $\Lambda$ is a diagonal matrix of the form $$\Lambda = \begin{bmatrix} \lambda_0 I & 0 \\ 0 & \lambda_1 I \end{bmatrix}$$

and $\lambda_0, \lambda_1 > 0$ are design parameters. It should be apparent that this is a generalization of the special case considered above, viz. $\lambda_0 = \lambda_1 = \lambda$.

According to this embodiment, values for $\lambda_0$ and $\lambda_1$ are computed as follows:

If $g_1 > g_0$ $\lambda_0 = \lambda$ $\lambda_1 = \lambda(g_1/g_0)^2$

Else $\lambda_1 = \lambda$ $\lambda_0 = \lambda(g_0/g_1)^2$ where $g_i$ denotes the AGC gain for the $i^{th}$ receive chain. While notation of time dependence of the disclosed method is not shown in the above equations, it should be understood that certain terms in the equations are time dependent and may be computed at various points in time to adaptively condition the covariance matrix of the data paths.

If the independent AGC gains happen to be equivalent, i.e., $g_0 = g_1$, then the equations above reduce to $\lambda_0 = \lambda_1 = \lambda$. The conditioning parameter $\lambda$ can be improved or optimized for best performance.

Figure 4:
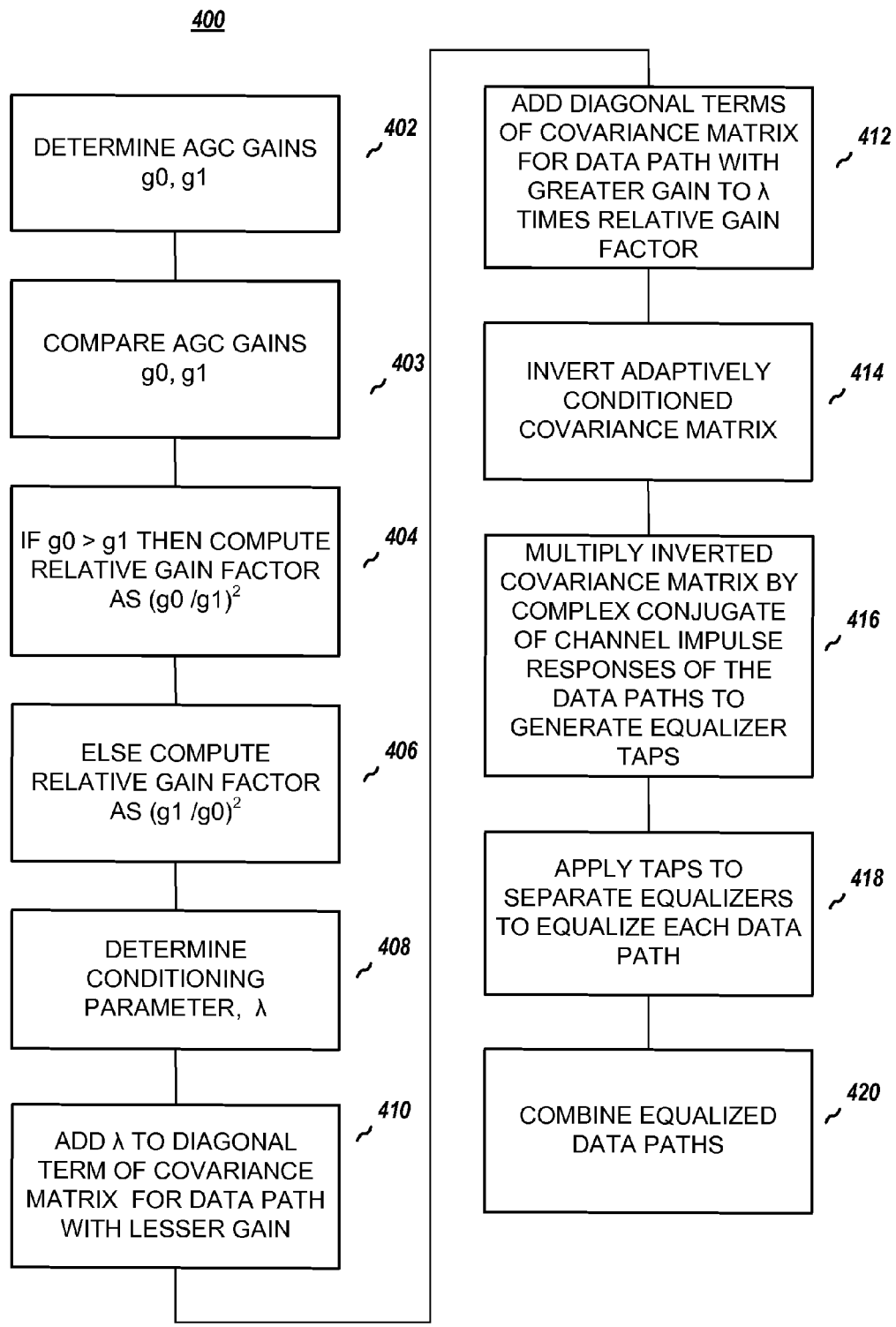
FIG. 4 is a process flow diagram showing a method for improving equalizer performance in a multi antenna receiver according to one aspect of the disclosure.

A method 400 for improving equalizer performance in a multi-antenna receiver according to the first illustrative embodiment of the present disclosure is described with reference to FIG. 4. In block 402, an automatic gain control (AGC) gain ($g_0$)) for a first data path is determined based on an AGC circuit of the first data path; and an AGC gain ($g_1$) of a second data path is determined based on an AGC circuit of the second data path.

In block 403, the gains $g_0$ and $g_1$ are compared. If $g_1$ is greater than $g_0$ then a relative gain factor is compiled by dividing $g_1$ by $g_0$ and squaring the result in block 404. If $g_1$ is less than or equal to $g_0$ then the relative gain factor is computed by dividing $g_0$ by $g_1$ and squaring the result in block 406.

In block 408 a conditioning parameter is determined. According to aspects of the present disclosure, the conditioning parameter may be computed by multiplying the number of equalizer taps for each antenna by 8 then taking a reciprocal of the result and multiplying the reciprocal by the trace of the covariance matrix.

In block 410, the conditioning parameter $\lambda$ is added to the diagonal of the covariance matrix corresponding to the data path with the lesser gain. In block 412, the conditioning parameter $\lambda$ is multiplied by the relative gain factor and added to the diagonal of the covariance matrix corresponding to the data path with the greater gain. If gain ($g_0$) of the first data path is equal to the gain ($g_1$) of the second data path then the relative gain factor times the conditioning parameter ($\lambda$) can be applied to the diagonal term corresponding to either one of the data paths, and the non-augmented conditioning parameter $\lambda$ can be applied to the other diagonal term of the covariance matrix.

The result of multiplying the diagonals of the covariance matrix in block 412 is an adaptively conditioned covariance matrix. In block 414, the adaptively conditioned covariance matrix is inverted. In block 416, the inverted covariance matrix is multiplied by the complex conjugate of the channel impulse responses of the first and second data paths to generate the equalizer taps. In block 418, the equalizer taps are applied to separate equalizers to equalize each data path. In block 420, the equalized data paths are combined to provide an improved signal.

According to a second aspect of the disclosure, the performance degradation caused by covariance matrix conditioning in the presence of unequal AGC gains is mitigated by "undoing" the effect of the unequal AGC gains, without reducing the SQNR on either of the receive chains. This method compensates for the unequal AGC gains applied to the two receive chains by scaling down the channel estimates and equalizer taps for the receive chain with lower received power (equivalently, with larger AGC gain). This method may be referred to as "Adaptive RxD Combining" because it adaptively determines the relative combining weights for the channel estimates and equalizer taps for the two receive chains based on relative AGC gains.

According to this embodiment, at an instant of time the stronger of the two chains is assigned a weight of 1 and the weaker of the two chains is assigned a weight of $s<1$ wherein "s" is the scaling factor. The method of scaling is described below wherein the term $g_i$ denotes the AGC gain for the $i^{th}$ receive chain.

If $g_1 > g_0$ then:
Designate the weaker chain as "Rx 1"
Compute the scaling factor $s = g_0/g_1$
Scale $\vec{h}_1$ by s, i.e., $\vec{h}_1' = s\vec{h}_1$.
Scale $R_{01}$ by s, i.e., $R'_{01} = sR_{01}$.
Scale $R_{11}$ by $s^2$, i.e., $R'_{11} = s^2 R_{11}$.

Compute the MMSE taps as follows:

$$\vec{c}'_{MMSE} = \begin{bmatrix} \vec{c}'_0 \\ \vec{c}'_1 \end{bmatrix} = \left( \underbrace{\begin{bmatrix} R_{00} & (R'_{01})^H \\ R'_{01} & R'_{11} \end{bmatrix}}_{R'} + \lambda I \right)^{-1} \underbrace{\begin{bmatrix} \vec{h}^*_0 \\ (\vec{h}'_1)^* \end{bmatrix}}_{h'}$$

Scale the MMSE taps for Rx 1 by s, i.e., $\vec{c}''_1 = s\vec{c}'_1$;
Use the taps $\vec{c}'_0$ and $\vec{c}''_1$ to equalize the signals received on Rx 0 and Rx 1, respectively.

Else if $g_0 \geq g_1$:
Designate the weaker chain as "Rx 0".
Compute the scaling factor $s = g_1/g_0$.
Scale $\vec{h}_0$ by s, i.e., $\vec{h}'_0 = s\vec{h}_0$.
Scale $R_{01}$ by s, i.e., $R'_{01} = sR_{01}$.
Scale $R_{00}$ by $s^2$, i.e., $R'_{00} = s^2 R_{00}$.
Compute the MMSE taps as follows:

$$\vec{c}'_{MMSE} = \begin{bmatrix} \vec{c}'_0 \\ \vec{c}'_1 \end{bmatrix} = \left( \underbrace{\begin{bmatrix} R'_{00} & (R'_{01})^H \\ R'_{01} & R_{11} \end{bmatrix}}_{R'} + \lambda I \right)^{-1} \underbrace{\begin{bmatrix} (\vec{h}'_0)^* \\ \vec{h}^*_1 \end{bmatrix}}_{h'}$$

Scale the MMSE taps for Rx 0 by s, i.e., $\vec{c}''_0 = s\vec{c}'_0$
Use the taps $\vec{c}''_0$ and $\vec{c}'_1$ to equalize the signals received on Rx 0 and Rx 1, respectively.

The free parameter $\lambda$ can be optimized for best performance In this embodiment, like in the first embodiment, the free parameter $\lambda$ set to $\lambda = aTr(R)$, with $a = 1/8$ J.

This aspect of the present disclosure provides performance benefits of covariance matrix conditioning even when the two receive chains experience unequal AGC gains, by performing appropriate AGC-dependent scaling of the channel impulse response, covariance, and the equalizer taps.

Figure 5:
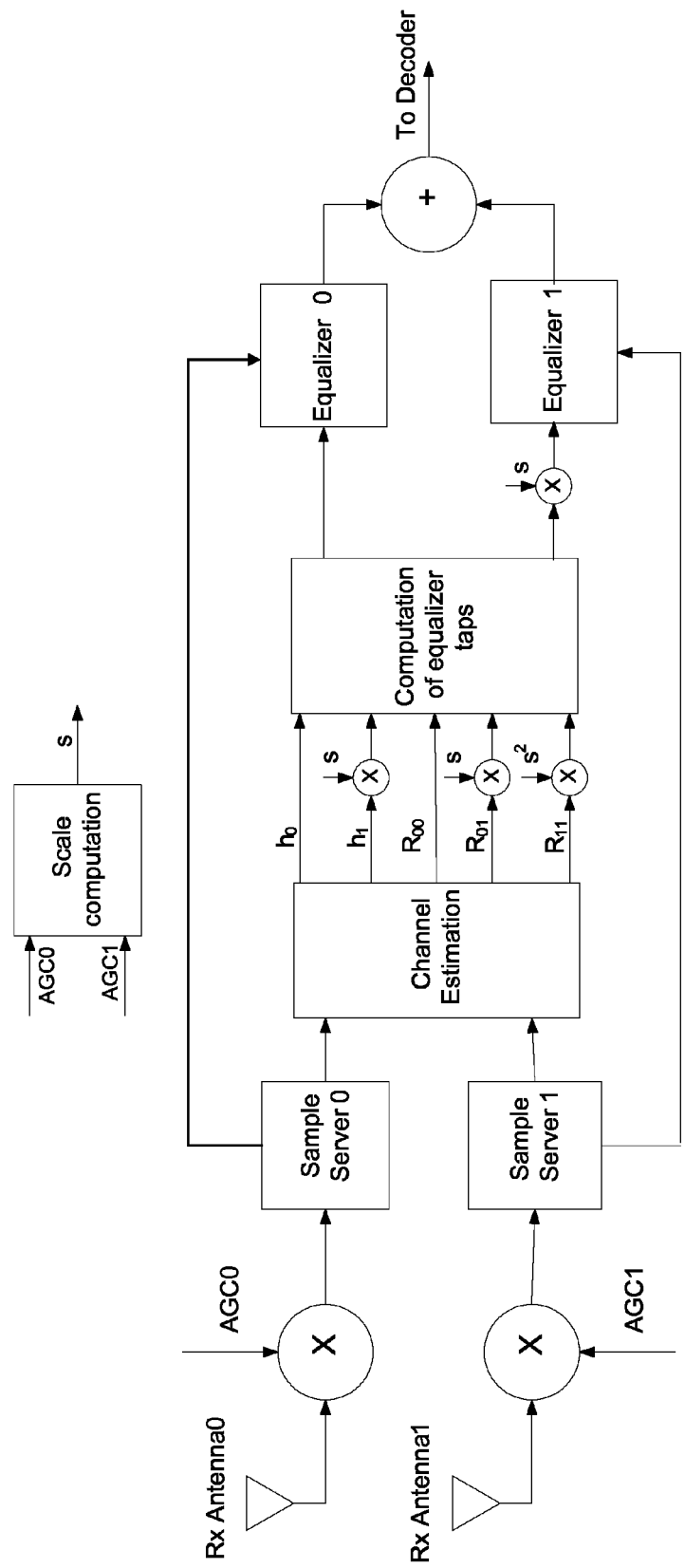
FIG. 5 is a high level block diagram of an equalizer data path with receive diversity according to an aspect of the disclosure.

FIG. 5 shows a high level block diagram of the equalizer data path with Adaptive RxD Combining according to the present disclosure for the case where Rx 1 (receive chain 1) is the weaker chain.

Figure 6:
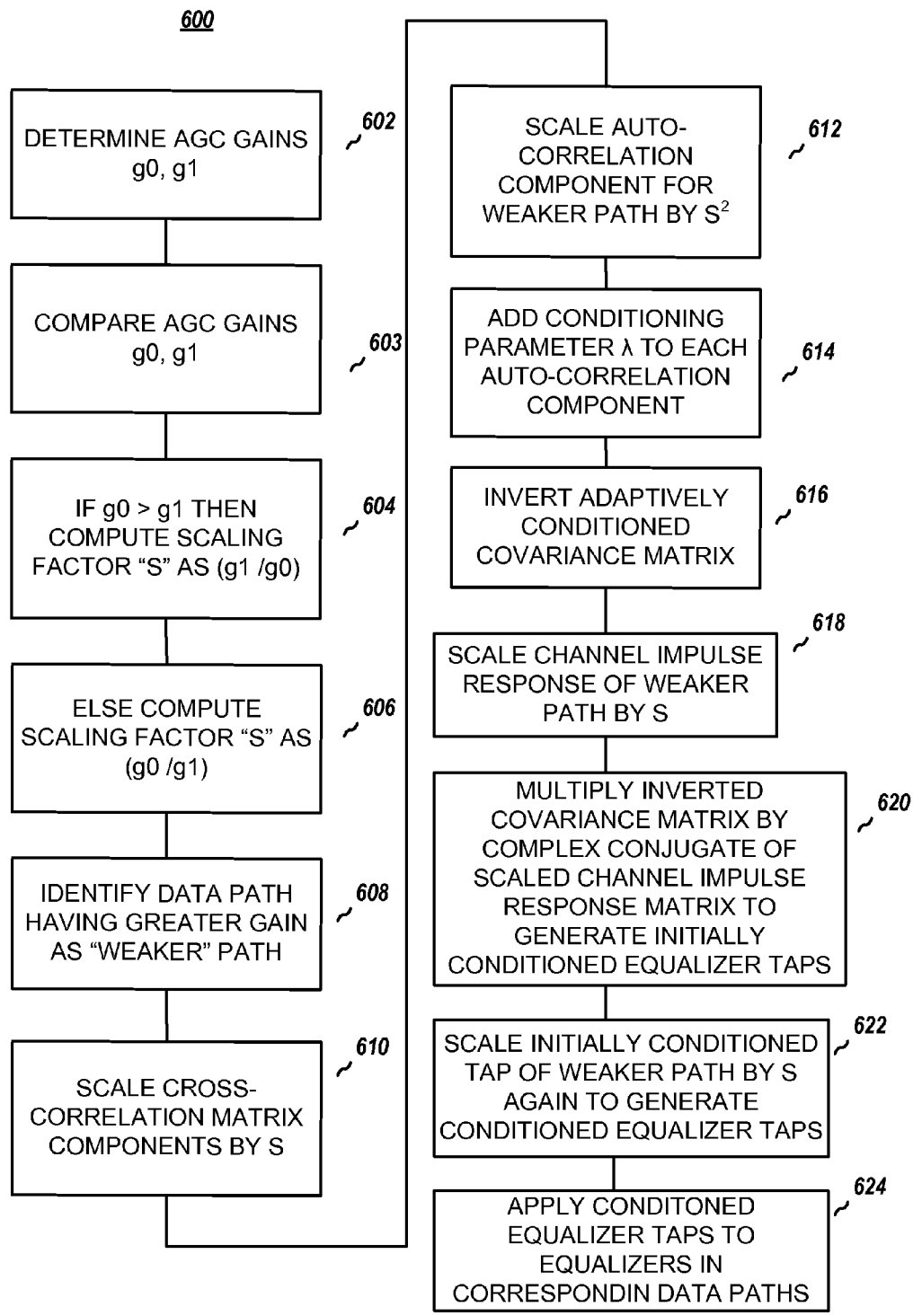
FIG. 6 is a process flow diagram showing a method for improving equalizer performance in a multi antenna receiver according to one aspect of the disclosure.

A method 600 for improving equalizer performance in a multi antenna receiver according to the second illustrative embodiment of the present disclosure is described with reference to FIG. 6. In block 602, an automatic gain control (AGC) gain ($g_0$)) for a first data path is determined based on an AGC circuit of the first data path; and an AGC gain ($g_1$) of a second data path is determined based on an AGC circuit of the second data path.

In block 603, the gains $g_0$ and $g_1$ are compared. If $g_1$ is greater than $g_0$ then a scaling factor is compiled by dividing $g_0$ by $g_1$ in block 604. If $g_i$ is less than or equal to $g_0$ then the scaling factor is computed by dividing $g_1$ by $g_0$ in block 606. The data path having greater gain is identified as the weaker path in block 608.

In block 610, the scaling factor (s) is applied to cross correlation matrix components of the covariance matrix. In block 612, the scaling factor squared ($s^2$) is applied to an auto correlation component of the covariance matrix corresponding to the weaker data path. Then, in block 614, a conditioning parameter ($\lambda$) is added to each auto correlation component of the covariance matrix including the scaled auto covariance component matrix corresponding to the weaker data path and a non-scaled auto covariance component matrix corresponding to the stronger data path. In block 616, the conditioned covariance matrix is inverted In block 618, the channel impulse response of the weaker data path is scaled by multiplying it with the scaling factor (s). In block 620, the inverted conditioned covariance matrix is multiplied by a complex conjugate of the scaled channel impulse response matrix to generate initially conditioned equalizer taps. In block 622 the initially conditioned equalizer tap corresponding to the weaker data path is further scaled by multiplying it by scaling factor (s). Each equalizer tap may then be applied to separate equalizers in their corresponding data paths in block 624.

Aspects of the present disclosure provide the performance benefits of covariance matrix conditioning even when the two receive chains experience unequal AGC gains, by performing AGC-dependent augmentation of the diagonal terms. The improvement or optimality of the disclosed method can be shown analytically for single path (flat fading channel) scenarios. Aspects of the present disclosure may also be extended to multipath (frequency selective fading channels) scenarios.

The illustrative embodiments of the present disclosure introduce very little additional computational complexity to the current equalizer architecture. For example, in the first illustrative embodiments, the only additional processing is the computation of one of two scalar terms, either $\lambda(g_1/g_0)^2$ or $\lambda(g_0/g_1)^2$.

Those of skill in the art should understand that information and signals may be represented using a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill should further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or a combination thereof designed to perform the functions described herein. A general-purpose processor may be a microprocessor, but in the alternative, the processor may be a conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or combination thereof. If implemented in software, the functions may be stored on or transmitted over as one or more instructions or code on a computer-readable medium. Computer-readable media includes both computer storage media and communication media that facilitates transfer of a computer program from one place to another. A storage media may be an available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or another medium that can be used to carry or store desired program code means in the form of instructions or data structures and that can be accessed by a general-purpose or special-purpose computer, or a general-purpose or special-purpose processor. Also, a connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable persons skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining an initial covariance matrix of a first data path and a second data path;
   determining a conditioned covariance matrix of the first data path and the second data path based on a first gain of the first data path and a second gain of the second data path by adding a conditioning parameter to a first diagonal of the initial covariance matrix and adding the conditioning parameter times a relative gain factor to a second diagonal of the initial covariance matrix, the first diagonal corresponding to a lesser gain data path and the second diagonal corresponding to a greater gain data path, the first gain being independent of the second gain;
   determining equalizer taps of the first data path and the second data path based on the conditioned covariance matrix;
   equalizing the first data path and the second data path with equalizer taps of the first data path and the second data path; and
   generating an equalized signal by combining the equalized first data path with the equalized second data path.

2. The method of claim 1, further comprising:
   determining the relative gain factor by:
      determining the first gain of the first data path;
      determining the second gain of the second data path; and
      squaring a ratio of the first gain of the first data path and the second gain of the second data path.

3. The method of claim 2, further comprising:
   determining the ratio by dividing the greater of the first gain of the first data path and the second gain of the second data path by the lesser of the first gain of the first data path and the second gain of the second data path.

4. The method of claim 1, further comprising:
   equalizing the first data path and the second data path by applying corresponding equalizer taps to a first linear filter in the first data path and to a second linear filter in the second data path.

5. The method of claim 1 comprising:
   determining the equalizer taps of the first data path and the second data path by multiplying the conditioned covariance matrix with a complex conjugate channel impulse response of the first data path and the second data path.

6. A method of wireless communication, comprising:
   determining an initial covariance matrix of a first data path and a second data path;
   identifying a weaker data path and a stronger data path of the first data path and the second data path;
   determining an initially scaled covariance matrix of the first data path and the second data path by multiplying each cross-correlation matrix of the initial covariance matrix by a scaling factor, and multiplying an auto-covariance matrix for the weaker data path in the initial covariance matrix by the scaling factor squared;
   determining a conditioned covariance matrix of the first data path and the second data path based on a first arm of the first data path and a second gain of the second data path by adding a conditioning parameter to each auto-covariance matrix of the initially scaled covariance matrix, the first gain being independent of the second gain;
   determining equalizer taps of the first data path and the second data path based on the conditioned covariance matrix;
   equalizing the first data path and the second data path with equalizer taps of the first data path and the second data path; and
   generating an equalized signal by combining the equalized first data path with the equalized second data path.

7. The method of claim 6, further comprising:
   determining the scaling factor by dividing a gain of the stronger data path by a gain of the weaker data path.

8. The method of claim 6, further comprising:
   determining a channel impulse response matrix of the first data path and the second data path;
   determining a scaled complex conjugate channel impulse response matrix of the first data path and the second data path by multiplying a channel impulse response of the weaker data path in the channel impulse response matrix to generate an initially scaled channel impulse response matrix, and determining a complex conjugate of the initially scaled channel impulse response matrix.

9. The method of claim 8, further comprising:

determining an initial set of equalizer taps of the first data path and the second data path by inverting the conditioned covariance matrix to generate an inverted conditioned covariance matrix and multiplying the inverted conditioned covariance matrix by the scaled complex conjugate channel impulse response matrix of the first data path and the second data path; and determining the equalizer taps of the first data path and the second data path by multiplying the initial set of equalizer taps corresponding to the weaker data path by the scaling factor.

10. An apparatus for wireless communication comprising:
at least one processor; and
a memory coupled to the at least one processor, the at least one processor being configured:
  to determine an initial covariance matrix of a first data path and a second data path;
  to determine a conditioned covariance matrix of the first data path and the second data path based on a first gain of the first data path and a second gain of the second data path by adding a conditioning parameter to a first diagonal of the initial covariance matrix and adding the conditioning parameter times a relative gain factor to a second diagonal of the initial covariance matrix, the first diagonal corresponding to a lesser gain data path and the second diagonal corresponding to a greater gain data path, the first gain being independent of the second gain;
  to determine equalizer taps of the first data path and the second data path based on the conditioned covariance matrix;
  to equalize the first data path and the second data path with the equalizer taps; and
  to generate an equalized signal by combining the equalized first data path with the equalized second data path.

11. The apparatus of claim 10, in which the processor is further configured to:
determine the first gain of the first data path;
determine the second gain of the second data path; and
square a ratio of the first gain of the first data path and the second gain of the second data path to determine the relative gain factor.

12. The apparatus of claim 11, in which the processor is further configured:
to divide a greater of the first gain of the first data path and the second gain of the second data path by a lesser of the first gain of the first data path and the second gain of the second data path to determine the ratio.

13. The apparatus of claim 10, in which the processor is further configured to apply corresponding equalizer taps to a first linear filter in the first data path and to a second linear filter in the second data path to equalize the first data path and the second data path.

14. The apparatus of claim 10, in which the processor is further configured to multiply the conditioned covariance matrix with a complex conjugate channel impulse response of the first data path and the second data path to determine the equalizer taps.

15. An apparatus for wireless communication comprising:
at least one processor; and
a memory coupled to the at least one processor, the at least one processor being configured:
  to determine an initial covariance matrix of a first data path and a second data path;
  to identify a weaker data path and a stronger data path of the first data path and the second data path;
  to determine an initially scaled covariance matrix of the first data path and the second data path by multiplying each cross-correlation matrix of the initial covariance matrix by a scaling factor, and multiplying an auto-covariance matrix for the weaker data path in the initial covariance matrix by the scaling factor squared;
  to determine a conditioned covariance matrix of the first data path and the second data path based on a first gain of the first data path and a second gain of the second data path by adding a conditioning parameter to each auto-covariance matrix of the initially scaled covariance matrix, the first gain being independent of the second gain;
  to determine equalizer taps of the first data path and the second data path based on the conditioned covariance matrix;
  to equalize the first data path and the second data path with the equalizer taps; and
  to generate an equalized signal by combining the equalized first data path with the equalized second data path.

16. The apparatus of claim 15, in which the processor is further configured to divide a gain of the stronger data path by a gain of the weaker data path to determine the scaling factor.

17. The apparatus of claim 15, in which the processor is further configured:
to determine a channel impulse response matrix of the first data path and the second data path;
to determine a scaled complex conjugate channel impulse response matrix of the first data path and the second data path by multiplying a channel impulse response of the weaker data path in the channel impulse response matrix to generate an initially scaled channel impulse response matrix, and
to determine a complex conjugate of the initially scaled channel impulse response matrix.

18. The apparatus of claim 17, in which the processor is further configured:
to determine an initial set of equalizer taps of the first data path and the second data path by inverting the conditioned covariance matrix to generate an inverted adaptively conditioned covariance matrix and multiplying the inverted adaptively conditioned covariance matrix by the scaled complex conjugate channel impulse response matrix of the first data path and the second data path; and
to determine the equalizer taps by multiplying the initial set of equalizer taps of the first data path and the second data path corresponding to the weaker data path by the scaling factor.

19. A computer program product for wireless communications in a wireless network, comprising
a non-transitory computer-readable medium having non-transitory executable program code recorded thereon, the program code comprising:
  program code to determine an initial covariance matrix of a first data path and a second data path;

program code to determine a conditioned covariance matrix of the first data path and the second data path based on a first gain of the first data path and a second gain of the second data path by adding a conditioning parameter to a first diagonal of the initial covariance matrix and adding the conditioning parameter times a relative gain factor to a second diagonal of the initial covariance matrix, the first diagonal corresponding to a lesser gain data path and the second diagonal corresponding to a greater gain data path, the first gain being independent of the second gain;

program code to determine equalizer taps of the first data path and the second data path based on the conditioned covariance matrix;

program code to equalize the first data path and the second data path with the equalizer taps; and program code to generate an equalized signal by combining the equalized first data path with the equalized second data path.

20. An apparatus for wireless communication, comprising:

means for determining an initial covariance matrix of a first data path and a second data path;

means for determining a conditioned covariance matrix of the first data path and the second data path based on a first gain of the first data path and a second gain of the second data path by adding a conditioning parameter to a first diagonal of the initial covariance matrix and adding the conditioning parameter times a relative gain factor to a second diagonal of the initial covariance matrix, the first diagonal corresponding to a lesser gain data path and the second diagonal corresponding to a greater gain data path, the first gain being independent of the second gain;

means for determining equalizer taps of the first data path and the second data path based on the conditioned covariance matrix;

means for equalizing the first data path and the second data path with equalizer taps of the first data path and the second data path; and means for generating an equalized signal by combining the equalized first data path with the equalized second data path.

* * * * *